July 18, 1933.  P. KÖHLER  1,918,342
REFRIGERATION
Filed March 12, 1931  2 Sheets-Sheet 1

INVENTOR
Peter Köhler.
BY
ATTORNEY

July 18, 1933. P. KÖHLER 1,918,342
REFRIGERATION
Filed March 12, 1931 2 Sheets-Sheet 2
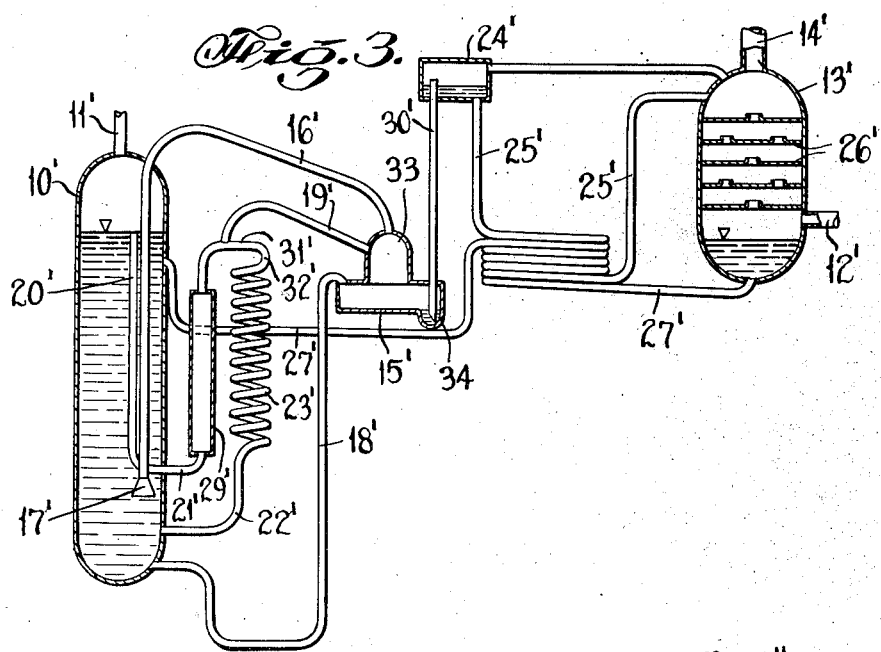
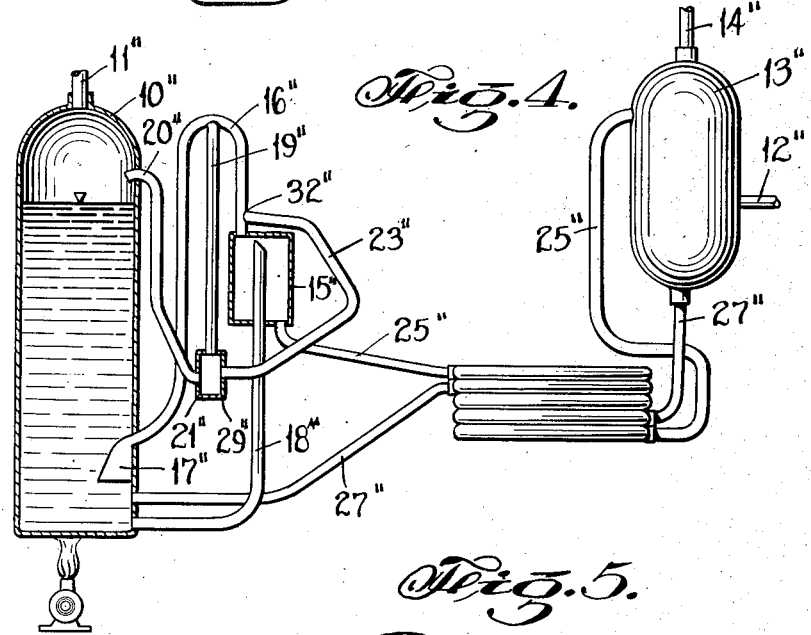
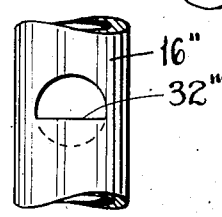
INVENTOR
Peter Köhler
BY
ATTORNEY Patented July 18, 1933

1,918,342

UNITED STATES PATENT OFFICE

PETER KÖHLER, OF STOCKHOLM, SWEDEN, ASSIGNOR, BY MESNE ASSIGNMENTS, TO ELECTROLUX SERVEL CORPORATION, OF NEW YORK, N. Y., A CORPORATION OF DELAWARE

REFRIGERATION

Application filed March 12, 1931, Serial No. 521,988, and in Sweden May 1, 1930.

This invention relates to absorption refrigerating systems and more specifically to the circulation of absorption liquid in systems of the pressure equalized type in which all parts are in open fluid connection.

An object of this invention is to utilize gas expelled from solution in the generator of absorption refrigerating apparatus for pumping weak absorption liquid from the generator to a higher level from which it flows by gravity to the absorber.

Figure 1:
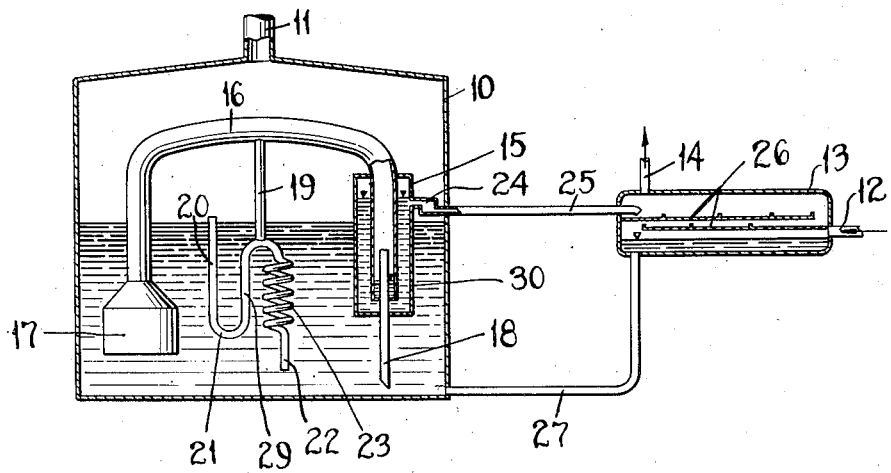
Figure 2:
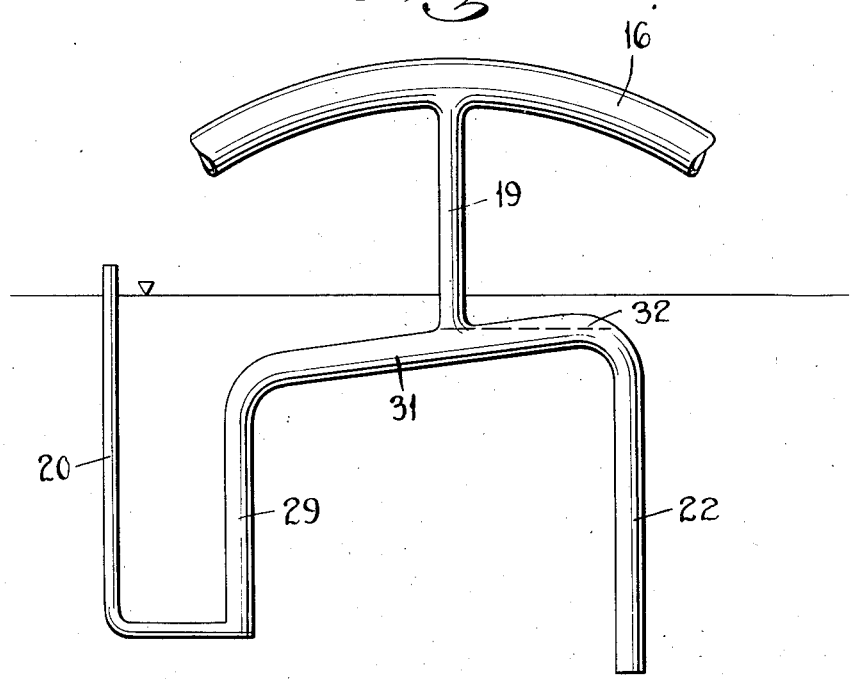

Other objects and advantages will be apparent from the following description taken in connection with the accompanying drawings, wherein, Figure 1 shows schematically an apparatus contemplated by this invention;

Figure 2 is a detail view of a modified form of liquid valve which may be used in place of that shown in Figure 1;

Figure 3, an absorption refrigerating system in which circulates a pressure equalizing medium and including a pump arrangement contemplated by this invention;

Figure 4, a refrigerating system embodying a modified arrangement contemplated by this invention; and Figure 5, a detail of the pipe connection 32 in Figure 4.

Referring to Figure 1 of the drawings, a generator 10 containing a solution of refrigerant in an absorption liquid is provided with a connection 11 through which the gas expelled from solution in the generator passes as usual to a rectifier and condenser, not shown, in which latter the gas is liquefied and then conducted to an evaporator where it vaporizes into the auxiliary gas, absorbing heat from the surrounding medium. The gas mixture flows from the evaporator, not shown, through a conduit 12 to the absorber 13 where the refrigerant vapor is absorbed by the weak liquid entering the absorber through conduit 25 and the auxiliary gas passes through conduit 14 back to the evaporator. Enriched absorption liquid flows from the absorber through conduit 27 back to the generator 10.

In order to circulate the absorption liquid between the generator and absorber a pump chamber 15 is provided. A U-tube 16 has its curved portion above the liquid level in the generator with one leg terminating within and near the bottom of the chamber 15 and the other leg terminating in a downwardly flaring portion or funnel 17, both ends of the U-tube being below the normal liquid level in the generator. A conduit 18 extending from a point near the bottom of the generator 10 terminates within the vessel 15 inside of the leg of the U-tube 16 slightly below the liquid level in the generator.

From the portion of the pressure pipe 16 located above the liquid level in the generator a pipe 19 extends downwardly and is connected below the liquid level to one leg 29 of a U-shaped vent pipe or valve 20, which the other leg terminates at or above the liquid level. Below the liquid level but above the upper end of the feed pipe 18, a pipe 22 is connected to the pipe 19 and extends downwardly in a coil 23 and terminates near the bottom of the generator. The pump vessel 15 is provided with an overflow 24 above the liquid level in the generator from which overflow a pipe 25 is connected to discharge into the upper part of the absorber 13.

The operation is as follows: when the apparatus is not operating the liquid level is the same in generator 10, absorber 13, both legs of the pressure pipe 16, and the pump chamber 15, and the pipes 18, 22, 29 and 20 are completely filled with liquid. When the generator is heated by some means well known in the art, as for instance a gas burner or an electric heating element, part of the gas expelled from solution will pass upwardly through the funnel 17 and collect above the liquid level in the pressure pipe 16. As the pressure increases, due to the accumulation of gas in the pipe 16 the liquid will be forced downwardly in both legs of the pressure pipe 16, feed pipe 18, leg 29 of the U-tube, and pipe 22. This will continue until the liquid level reaches the opening in the upper end of the feed pipe 18 when liquid will then be forced upwardly in the pump chamber 15 until it reaches the level from which it will pass out through overflow 24 and pipe 25 into the absorber 13. This will continue until the gas pressure forces the liquid in leg 29 downwardly to the lowest portion 21 of the U-tube valve when the liquid column in leg 20 will be expelled into the generator and allow the gas in the pressure pipe 16 to escape, thus equalizing the pressures in the generator and pressure pipe 16. The liquid level in pump chamber 15 will then fall, the liquid level in leg 17 rise, and the liquid which overflows from the pump vessel to the absorber will be replaced from the generator through feed pipe 18.

When the pressures are equalized, liquid from the generator will flow upwardly in pipe 22 and into the U-tube so to close the latter so that gas pressure may again build up in the pipe 16. The coil 23 in the pipe 22 will function to retard the flow of liquid through the latter to allow the pressure in the pipe 16 to release into the generator through the U-tube 20 for sufficient length of time to allow the pressure to attain its minimum value so that a greater amount of liquid may enter the U-tube 20 before the pressure in pipe 16 rises to again force this liquid out, thus insuring a sufficient pressure in the pipe 16 to raise the level of the liquid in pump chamber 15 high enough to overflow into the absorber. If the flow of liquid through pipe 22 were not retarded, small amounts or slugs of liquid would be continuously forced out of the vent pipe 20 and the pressure in pipe 16 would never rise sufficiently to raise the level of the liquid in the pump chamber 15 to the overflow 24.

In order to further assure the proper filling of the valve 20 and insure the necessary amount of liquid required for the sealing of this valve during each pumping action, an arrangement contemplated by this invention shown in Figure 2, may be used. In this arrangement the pipe 19 from the pressure pipe 16 is connected to the valve pipe 20 and the pipe 22 through a pipe 31 which slopes from its upper end, connected to the pipe 22, to its lower end, connected to the leg 29 of the valve pipe 20. The retarding coils 23 are omitted in this illustration for the sake of clarity but it is to be understood that some sort of retarding means for the upward flow of liquid through the pipe 22 is desired. The pipe 31 is sufficiently large in diameter to permit the passage of gas and liquid flowing in opposite directions. On account of the size of the pipe 31 the gas pressure which builds up when the first flow of liquid closes the valve pipe 20 must break the liquid seal in pipe 31 so that the pressure will not only act on the liquid already in the valve 20 but also on the liquid in the lower part of the inclined pipe 31 in the direction of the falling liquid. A sufficient quantity of liquid will be available for filling the valve pipe 20 before the pressure in pipe 16 acts to force this liquid out, if pipe 31 has a sufficiently large diameter and slope when the gas pressure will be the same on the liquid from the connection of pipe 19 to pipe 31 to the upper end 32 of pipe 31. The above result might also be obtained by connecting the upper end 32 of pipe 31 directly to the pipe 16 or pipe 19.

In Figure 3 is shown a refrigerating system of the pressure equalized type having a modified arrangement contemplated by this invention for circulating the absorption liquid between the boiler and the absorber. The corresponding parts are similarly numbered in Figures 1 and 3 so that the operation described in connection with Figure 1 can be followed out in connection with Figure 3. The pump chamber 15' in this arrangement is provided with a safety liquid collector 34 and the space 30 in the pump chamber in Figure 1 is a pipe 30' extending from within the liquid collector 34 to the overflow 24'. The pump chamber and valve device are placed outside the generator and the leg 29' of the U-tube valve 20' is shown somewhat enlarged.

Briefly, in the operation of this arrangement, gas will flow upwardly through funnel 17 and collect in pressure pipe 16 and create a pressure in dome 33 of the pump chamber 15' forcing liquid downwardly through pipe 18', pipe 22', leg 29' of the valve 20', and upwardly in pump pipe 30' to the overflow 24' from whence it will pass through pipe 25' to the absorber 13'. This will continue until the pressure has increased sufficiently to force the liquid downwardly to the lowest point 21' in the valve pipe 20' when the liquid will be expelled from this tube into the generator, thus equalizing the pressures in pipe 16' and generator 10'. As the pressure in pipe 16' falls the pump chamber 15 will again be filled through pipe 18' and liquid caused to flow through pipe 29' of the valve 20' through pipe 31' which latter may be given such a slope and diameter that a sufficient quantity of sealing liquid will be supplied to the valve 20' before the pressure in pipe 16 rises sufficiently to force the liquid back through pipe 22 as described in connection with Figure 2.

Gas entering the pressure pipe 16' through the funnel 17' near the bottom of the generator will consist mostly of absorption liquid vapor and the efficiency of the apparatus may be increased if this vapor is excluded from the generator. This may be accomplished by venting the pump gases into the absorber which may be readily done in a system of the pressure equalized type since the pressures in the generator and absorber are the same. Further, it is not necessary to provide a separate pipe 22' for filling the valve 20' as a supply line for the valve may be connected to the filling line 18' for the pump chamber. Besides reducing the number of pipes this has the further advantage that refilling of the pump chamber is insured before the valve is again closed. Figure 4 shows such a construction.

In the modification illustrated in Figure 4 the pump chamber 15" is filled through the pipe 18" as in the previously described arrangement. The valve pipe 20" having a leg 29" which is enlarged but much shorter than in previously described arrangements is connected through pipe 19" to the portion of the pressure pipe 16" above the liquid level in the generator. The vessel or leg 29″ of the valve pipe 20″ in this modification is connected to the generator by means of a retarding line 23″, the lower end of the pipe 16″ which is connected to the pump chamber 15″, the pump chamber, and filling line 18″.

The operation corresponds to that of the previously described arrangements and is briefly as follows: gas pressure in pipe 16″, due to the gas collected in the generator through the funnel 17″, will pump liquid from the chamber 15″ through pipe 25″ to the absorber 13″ until the height of the liquid column in pipe 25″ reaches the height of the column in valve pipe 20″ when the liquid will be forced out of the latter and the pressures in pipe 16″ and the generator equalized. The pump chamber 15 will be refilled through pipe 18″ and when the chamber is filled the liquid will rise further in the leg of the pipe 16″ which is slightly smaller in diameter than pipe 18″ so that the sudden decrease in cross section will raise the liquid pressure on the rising liquid in this section of pipe. When the rising liquid reaches the connection 32″ it will flow into the retarding pipe 23″ which has its upper portion inclined at a greater angle than its lower portion in order to attain a decrease in the acceleration of the liquid flowing through this pipe into the vessel or leg 29″ of the valve 20″.

To prevent small quantities or slugs of liquid from flowing into the pipe 23″ past the connection 32″ before the liquid rising in the pipe 16″ from the pump chamber 15″ definitely reaches the level of the connection 32″ and thus prematurely sealing the valve 20″, a baffle or weir may be provided at the lower part of the opening of pipe 23″ in the pipe 16″ at 32″ as shown in Figure 5. When the pipes are welded together a piece of material with a straight edge may be placed over the lower part of the opening or some material may be built up during the process of welding the pipes. Further assurance against premature valve action may be had by placing a similar ledge or weir across the opening of pipe 23″ into the vessel of leg 29″ of the valve 20″.

It will be obvious to those skilled in the art that various other changes may be made in the construction and arrangement without departing from the spirit of the invention and therefore the invention is not limited to what is shown in the drawings and described in the specification but only as indicated in the appended claims.

I claim:

1. Refrigerating apparatus of the pressure equalized absorption type including a generator for containing a solution of refrigerant in an absorption liquid, a vapor liquid pump, an absorber, a discharge connection from said pump to the upper part of said absorber, a conduit from the lower part of said absorber to the generator, a pressure pipe having an open end below the liquid level in the generator with its other end connected to said pump below the liquid level in the generator and a portion between said ends above the liquid level in the generator, a liquid connection between said pump and the generator, said pressure pipe having a vent above the liquid level in the generator to the vapor space in said generator, a liquid seal in said vent adapted to be broken responsive to an increase of pressure in said pressure pipe, and means for renewing said liquid seal responsive to a decrease in pressure in said pressure pipe.

2. Refrigerating apparatus of the pressure equalized absorption type including a generator for containing a solution of refrigerant in an absorption liquid, a fluid tight vessel enclosing a chamber having its upper portion above the liquid level in the generator and its lower portion below the liquid level in the generator, an absorber, a connection from the upper part of said vessel to the upper part of said absorber, a connection from the lower part of said absorber to said generator, an inverted U-tube having one end below the liquid level in the generator with its other end extending into the lower portion of said vessel and its curved portion above the liquid level in the generator, a pipe extending from the liquid space in said generator into said vessel and terminating within the end of said U-tube and below the liquid level in the generator, a second U-tube located below the liquid level in the generator with one end extending into the vapor space in said generator and the other end connected to the first said U-tube above the liquid level in the generator, and a connection from the liquid space in said generator to said second U-tube at a point below the liquid level in the generator.

3. Refrigerating apparatus of the pressure equalized absorption type including a generator containing a solution of refrigerant in an absorption liquid, a fluid tight vessel enclosing a chamber having its upper portion above the liquid level in the generator and its lower portion below the liquid level in the generator, an absorber, a connection from the upper part of said vessel to the upper part of said absorber, a connection from the lower part of said absorber to said generator, an inverted U-tube having one end below the liquid level in the generator, its other end extending into the lower portion of said vessel and its curved portion above the liquid level in the generator, a pipe extending from the liquid space in said generator into said vessel and terminating within the end of said U-tube and below the liquid level in the generator, a second U-tube located below the liquid level in the generator with one end extending into the vapor space in said generator and the other end connected to the first said U-tube above the liquid level in the generator, a connection from the liquid space in said generator to said second U-tube at a point below the liquid level in the generator, and a liquid flow-retarding means in said connection.

4. Apparatus of the class described including means for circulating absorption liquid between the generator and absorber comprising a pump vessel having its upper portion above the liquid level in the generator and its lower portion below the liquid level in the generator, an overflow connection from the upper part of said pump vessel to the absorber, a return connection from the absorber to said generator, an inverted U-tube having one end terminating within said generator below the liquid level therein, its central portion above the liquid level in the generator and its other end extending into said pump vessel and terminating near the bottom thereof, a liquid connection from said generator extending into said pump vessel and terminating within the end of said inverted U-tube below the liquid level in the generator, a U-bend liquid trap having one leg extending upwardly and terminating in the vapor space of said generator, a liquid supply pipe having one end terminating near the bottom of the generator, a pipe connection to the other end of said supply line below the liquid level in the generator and sloping downwardly to the other leg of the said U-bend liquid trap, and a connection from the upper portion of said inverted U-tube to the last said pipe.

5. Apparatus of the class described including means for circulating absorption liquid between the generator and absorber comprising a pump vessel having its upper portion above the liquid level in the generator and its lower portion below the liquid level in the generator, an overflow connection from the upper part of said pump vessel to the absorber, a return connection from the absorber to said generator, an inverted U-tube having one end terminating within said generator below the liquid level therein, its central portion above the liquid level in the generator and its other end extending into said pump vessel and terminating near the bottom thereof, a liquid connection from said generator extending into said pump vessel and terminating within the end of said inverted U-tube below the liquid level in the generator, a U-bend liquid trap having one leg extending upwardly and terminating in the vapor space of said generator, a liquid supply pipe having one end terminating near the bottom of the generator, liquid flow-retarding means in said supply line, a pipe connection to the other end of said supply line below the liquid level in the generator and sloping downwardly to the other leg of the said U-bend liquid trap, and a connection from the upper portion of said inverted U-tube to the last said pipe.

6. Apparatus of the class described including means for circulating absorption liquid between the generator and absorber comprising a fluid tight pump vessel, a pump pipe from said vessel connected to discharge into said absorber, a liquid supply line from the generator to said pump vessel, a pipe having one end terminating within the generator below the liquid level therein, its other end connected to the upper part of said pump vessel and its intermediate portion located above the liquid level in the generator, a U-bend liquid trap having one leg extending into the generator and terminating in the vapor space thereof, a liquid supply line from the generator, a connection from the other end of said supply line to the other leg of said U-bend liquid trap and a conduit between the last said connection and the upper portion of said pump vessel.

7. Apparatus of the class described including means for circulating absorption liquid between the generator and absorber comprising a fluid tight pump vessel, a pump pipe from said vessel connected to discharge into said absorber, a liquid supply line from the generator to said pump vessel, a pipe having one end terminating within the generator below the liquid level therein, the other end connected to the upper part of said pump vessel and its intermediate portion located above the liquid level in the generator, a U-bend liquid trap having one leg extending into the generator and terminating in the vapor space thereof, a liquid supply line from the generator, a liquid flow-retarding means in said line, a connection from the other end of said supply line to the other leg of said U-bend liquid trap and a conduit between the last said connection and the upper portion of said pump vessel.

8. Apparatus of the class described including means for circulating absorption liquid between the generator and absorber comprising a pump vessel positioned below the liquid level of the generator, a conduit from the lower part of said pump vessel to the upper part of the absorber, a connection from the lower part of the absorber to the generator, a pipe from the lower part of the generator extending upwardly within and terminating near the top of said pump vessel, an inverted U-tube having one end extending into and terminating below the liquid level in the generator, its other end connected to the top of said pump vessel and its intermediate portion extending above the liquid level in the generator, a second vessel positioned below said pump vessel, a pipe connecting said second vessel with the vapor space in the generator, a second pipe connecting the upper part of said second vessel and the intermediate portion of said inverted U-tube, and a liquid supply line to said second vessel from said inverted U-tube at a point adjacent its connection to the upper part of said pump vessel.

9. Apparatus of the class described including means for circulating absorption liquid between the generator and absorber comprising a pump vessel positioned below the liquid level of the generator, a conduit from the lower part of said pump vessel to the upper part of the absorber, a connection from the lower part of the absorber to the generator, a pipe from the lower part of the generator extending upwardly within and terminating near the top of said pump vessel, an inverted U-tube having one end extending into and terminating below the liquid level in the generator, its other end connected to the top of said pump vessel and its intermediate portion extending above the liquid level of the generator, a second vessel positioned below said pump vessel, a pipe connecting said second vessel with the vapor space in the generator, a second pipe connecting the upper part of said second vessel and the intermediate portion of said inverted U-tube, a liquid supply line to said second vessel from said inverted U-tube at a point adjacent its connection to the upper part of said pump vessel, and a liquid flow-retarding means in said liquid supply line.

10. Apparatus of the class described including means for circulating absorption liquid between the generator and absorber comprising a pump vessel positioned below the liquid level of the generator, a conduit from the lower part of said pump vessel to the upper part of the absorber, a connection from the lower part of the absorber to the generator, a pipe from the lower part of the generator extending upwardly within and terminating near the top of said pump vessel, an inverted U-tube having one end extending into and terminating below the liquid level in the generator, its other end connected to the top of said pump vessel and its intermediate portion extending above the liquid level of the generator, a second vessel positioned below said pump vessel, a pipe connecting said second vessel with the vapor space in the generator, a second pipe connecting the upper part of said second vessel and the intermediate portion of said inverted U-tube, a liquid supply line to said second vessel from said inverted U-tube at a point adjacent its connection to the upper part of said pump vessel, a liquid flow-retarding means in said liquid supply line, and a ledge across the lower part of the opening formed by the connection of the liquid supply line to the inverted tube.

11. Apparatus of the class described including means for circulating absorption liquid between the generator and absorber comprising a pump vessel positioned below the liquid level of the generator, a conduit from the lower part of said pump vessel to the upper part of the absorber, a connection from the lower part of the absorber to the generator, a pipe from the lower part of the generator extending upwardly within and terminating near the top of said pump vessel, an inverted U-tube having one end extending into and terminating below the liquid level in the generator, its other end connected to the top of said pump vessel and its intermediate portion extending above the liquid level of the generator, a second vessel positioned below said pump vessel, a pipe connecting said second vessel with the vapor space in the generator, a second pipe connecting the upper part of said second vessel and the intermediate portion of said inverted U-tube, a liquid supply line to said second vessel from said inverted U-tube at a point adjacent its connection to the upper part of said pump vessel, a liquid flow-retarding means in said liquid supply line, a ledge across the lower part of the opening formed by the connection of the liquid supply line to the inverted tube, and a second ledge across the lower part of the opening formed by the connection between said liquid supply line to said second vessel.

12. In an absorption refrigeration system of the pressure equalized type including a generator and an absorber, means for circulating absorption liquid between said generator and absorber comprising a vapor liquid lift connected to discharge into said absorber, a connection for weak absorption solution from said generator to said lift, means for accumulating below the liquid level gas expelled from solution in said generator and applying the pressure of the accumulated gas to said lift, a vent for relieving pressure of the accumulated gas having a liquid column seal adapted to be displaced upon a predetermined increase of pressure, and an independent connection to said generator for replacing liquid in said seal.

13. In an absorption refrigeration system of the pressure equalized type including a generator and an absorber, a vapor liquid lift connected to raise liquid from said generator into said absorber, means for supplying said lift with vapor under pressure, a pressure relief conduit for said lift having a liquid column seal adapted to be displaced upon predetermined increase of pressure, and an independent connection to said generator for supplying liquid to replace said seal.

14. In an absorption refrigeration system of the pressure equalized type, a vapor liquid lift for circulation of absorption solution, a liquid column pressure relief valve for said lift, and an independent connection to said valve for the replacement liquid.

PETER KÖHLER.